(12) United States Patent
Huang et al.

(10) Patent No.: US 12,044,786 B1
(45) Date of Patent: Jul. 23, 2024

(54) METHOD, SYSTEM, AND INTELLIGENT TERMINAL FOR ONE-BIT QUANTIZATION DIRECTION OF ARRIVAL ESTIMATION

(71) Applicant: SHENZHEN UNIVERSITY, Guangdong (CN)

(72) Inventors: Lei Huang, Shenzhen (CN); Mingyang Chen, Shenzhen (CN); Qiang Li, Shenzhen (CN); Xiaopeng Li, Shenzhen (CN); Lifang Feng, Shenzhen (CN); Peiwen Wu, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 18/510,832

(22) Filed: Nov. 16, 2023

(30) Foreign Application Priority Data

Oct. 12, 2023 (CN) .......................... 202311317494.1

(51) Int. Cl.
  *G01S 3/02* (2006.01)
  *G01S 3/12* (2006.01)
(52) U.S. Cl.
  CPC ................ *G01S 3/023* (2013.01); *G01S 3/12* (2013.01)
(58) Field of Classification Search
  None
  See application file for complete search history.

(56) References Cited

U.S. PATENT DOCUMENTS

| | | | |
|---|---|---|---|
| 6,483,459 B1 | 11/2002 | Hou et al. | |
| 11,099,253 B2 | 8/2021 | Kang | |
| 11,239,555 B2* | 2/2022 | Behdad | H01Q 3/46 |
| 2013/0278463 A1 | 10/2013 | Nilsson et al. | |
| 2023/0152424 A1* | 5/2023 | Zhao | G01S 7/356 |
| | | | 342/193 |

FOREIGN PATENT DOCUMENTS

| | | |
|---|---|---|
| CN | 111965592 A | 11/2020 |
| CN | 114720938 A | 7/2022 |

* cited by examiner

*Primary Examiner* — Whitney Moore
(74) *Attorney, Agent, or Firm* — Maier & Maier, PLLC

(57) ABSTRACT

A method, a system and an intelligent terminal for one-bit quantization DoA estimation, which include: when a quantity of far-field and uncorrelated spatial narrow-band source signals are incident from different directions to a uniform linear array receiver, receiving the narrow-band source signals by a quantity of antenna array elements, and the vector and matrix are used to model the received signals by one-bit quantization to obtain a joint probability mass model of one-bit quantization DoA estimation; deriving the joint probability mass model of one-bit quantization DoA estimation, and constructing an $l_{2,1}$ norm optimization model based on the maximum likelihood principle; solving the steepest descent direction of the optimization model by steepest descent method to obtain the one-bit quantization DoA and the source number.

8 Claims, 6 Drawing Sheets

S100 — Receiving, when a quantity of far-field and uncorrelated spatial narrow-band source signals are incident from different directions to an uniform linear array receiver, the narrow-band source signals by a quantity of antenna array elements, expressing received signals at different time in matrix form and output signals of the quantity of antenna array elements in vector form, performing one-bit quantization to the received signals, and re-modeling the received signals after quantization to obtain a joint probability mass model of one-bit quantization DoA estimation.

S200 — Deriving parameters to be estimated based on the joint probability mass model of one-bit quantization DoA estimation.

S300 — Constructing, based on maximum likelihood principle and spatial row sparse property, an optimization model based on the maximum likelihood principle by using the parameters to be estimated.

S400 — Obtaining, based on the optimization model, a steepest descent direction of the optimization model.

S500 — Solving, based on the steepest descent direction of the optimization model, the optimization model by steepest descent method to obtain a one-bit quantization DoA and a source number.

FIG. 1

METHOD, SYSTEM, AND INTELLIGENT TERMINAL FOR ONE-BIT QUANTIZATION DIRECTION OF ARRIVAL ESTIMATION

CROSS-REFERENCES TO RELATED APPLICATIONS

This application claims priority to Chinese Patent Application No. 202311317494.1, filed on Oct. 12, 2023, the content of all of which is incorporated herein by reference.

TECHNICAL FIELD

The present disclosure is related to the field of electronic information technology. More particularly, the present disclosure is related to a method, system, and intelligent terminal for one-bit quantization direction of arrival (DoA) estimation.

BACKGROUND

Direction of Arrival (DoA) estimation, as a spatial processing technology, is one of the key technologies in array signal processing, and is widely used in radar, sonar, wireless communication and many other fields.

In practical application, the signal received by radar system always needs to be quantization before it can be sent to signal processing equipment for DoA estimation. Signal quantization refers to comparing the amplitude of a signal with a series of integer multiples of a certain minimum number unit, and replacing the amplitude with the minimum number unit multiple closest to the amplitude of the signal, so that a signal with continuously changing amplitude becomes a quantization signal with a series of finite discrete values. Analog-to-Digital Converters (ADCs) are usually used for signal quantization. The higher the quantization bits, the higher the precision of ADC. At the same time, more data is generated, which will bring great pressure to the radar system for storage, transmission and processing, and will also consume more energy.

In order to overcome the above disadvantages of high-precision quantization ADC, one-bit ADC has drawn attention under this background. One-bit ADC is the ADC with the lowest quantization bits, which is one bit. In the quantization process, the one-bit ADC is simplified as a binary comparator, and the signal is compared with the threshold. If the signal is greater than the threshold, the quantization value is 1, otherwise the quantization value is −1. The amount of data generated is greatly reduced, thus effectively reducing the storage, transmission and processing pressure of the radar system; at the same time, due to the simple working principle of the binary comparator, the technical realization, construction cost and energy consumption are greatly reduced, and the data acquisition speed is significantly improved. Therefore, the generation of one-bit ADC can simplify the radar system, lower the cost, improve the efficiency and so on, which is conducive to promoting the development of small radar systems.

At present, for small radar systems equipped with one-bit ADC, the methods used for one-bit quantization DoA estimation are mainly divided into two categories: one is compressed sensing-based DoA estimation, which means that the consistency of the positive and negative signs of a one-bit signal is taken as the optimization goal, and then DoA estimation is completed through compressive sensing theory. The disadvantage of this method is that the estimation error is relatively large which makes the method impractical in real systems. The other is the subspace-based DoA estimation relies on the Arcsine Law, which means that the sample covariance matrix of a one-bit signal is linked to the unquantized normalized covariance matrix through Arcsine Law, and then the DoA estimation is completed by using traditional tools such as Multiple Signal Classification and rotational invariance techniques. The disadvantage of this method is that the method needs the prior knowledge of the exact source number, otherwise the DoA estimation error will be great. However, the source number is unknown in practical work and cannot be used as prior knowledge, so it needs to be obtained by using source number estimation, while traditional source number estimation algorithms, such as Akaike information theory principle, minimum description length principle and effective detection principle, are not suitable in the one-bit quantization case, which makes it difficult to realize this method. Therefore, the existing methods suitable for one-bit quantization DoA estimation have the defect of low estimation accuracy.

SUMMARY

In view of the deficiencies in existing technology above, the purpose of the present disclosure is to provide a method, a system, and an intelligent terminal for one-bit quantization DoA estimation, aimed at solving the problem that the existing methods suitable for one-bit quantization DoA estimation have the defect of low estimation accuracy.

To solve the problem above, the first aspect of the present disclosure provides a one-bit quantization DoA estimation method, comprising the following steps:

When a quantity of far-field and uncorrelated spatial narrow-band source signals are incident from different directions to a uniform linear array receiver, receiving the narrow-band source signals by a quantity of antenna array elements, expressing received signals at different times in matrix form and output signals of the quantity of antenna array elements in vector form, performing one-bit quantization to the received signals, and re-modeling the received signals after quantization to obtain a joint probability mass model of one-bit quantization DoA estimation;

Deriving parameters to be estimated based on the joint probability mass model of one-bit quantization DoA estimation;

Based on the maximum likelihood principle and spatial row sparse property, constructing an optimization model based on the maximum likelihood principle by using the parameters to be estimated;

Based on the optimization model, obtaining a steepest descent direction of the optimization model;

Based on the steepest descent direction of the optimization model, solving the optimization model by steepest descent method to obtain a one-bit quantization DoA and a source number.

Optionally, the uniform linear array receiver comprises the plurality of antenna array elements, and a distance between antenna array elements is less than or equal to a half wavelength of the incident signal.

Optionally, the step of when a quantity of far-field and uncorrelated spatial narrow-band source signals are incident from different directions to the uniform linear array receiver, receiving the narrow-band source signals by a quantity of antenna array elements, expressing received signals at different time in matrix form and expressing output signals of the quantity of antenna array elements in vector form; performing one-bit quantization to the received signals;

re-modeling the received signals after quantization to obtain a joint probability mass model of one-bit quantization DoA estimation, comprises:

When K spatial narrow-band source signals are incident from different directions to the uniform linear array receiver with incident angles of $\theta=[\theta_1, \theta_2, \ldots, \theta_K]^T$, the expression for the output signals $x_m(n)$ of the m-th array element of the uniform linear array receiver at the n-th snapshot is denoted by equation below:

$$x_m(n) = \sum_{k=1}^{K} s_k(n) e^{j2\pi \frac{(m-1)d\sin\theta_k}{v}} + \epsilon_m(n), m = 1, 2, \ldots, M,$$

where, $s_k(n)$ is the k-th source signal incident to the array receiver, $\epsilon_m(n)$ is additive noise of the m-th array element, $j=\sqrt{-1}$ is imaginary unit, e is the base of the natural logarithm, v is a wavelength of the source signal, d is a distance between adjacent array elements of the uniform linear array receiver, M is the number of the uniform linear array receivers, and T represents transposition;

Arranging the output signals of the M array elements at the n-th snapshot to a column vector, equation is denoted as below:

$$x(n)=As(n)+\epsilon(n).$$

where, $x(n)$ is the output signal vector for the M×1 dimension of the array, and is expressed as $x(n)=[x_1(n), x_2(n), \ldots, x_M(n)]^T$; $\epsilon(n)$ is the additive noise vector for the M×1 dimension of the array, and is expressed as $\epsilon(n)=[\epsilon_1(n), \epsilon_2(n), \ldots, \epsilon_M(n)]^T$; $s(n)$ is the spatial source signal for the K×1 dimension, and is expressed as $s(n)=[s_1(n), s_2(n), \ldots, s_K(n)]^T$; A is a manifold matrix for the M×K dimension, and is expressed as $A=[a(\theta_1), a(\theta_2), \ldots, a(\theta_K)]$, and the steering vector of the k-th source signal is the M×1 dimensional vector. The expression for $a(\theta_k)$ is denoted by equation below:

$$a(\theta_k) = \left[1, e^{j2\pi\frac{d\sin\theta_k}{v}}, \ldots, e^{j2\pi\frac{(M-1)d\sin\theta_k}{v}}\right]^T,$$

where, additive noise vector, $\epsilon(n)\sim CN(0,\sigma^2 I_M)$, represents that E(n) follows a complex circular Gaussian distribution with a mean value of all-zero vector 0 in M×1 dimension and a covariance matrix of $\sigma^2 I_M$, among which 02 is a variance of noise, and $I_M$ represents the identity matrix of the M×M dimension and is independent of the source signals.

When performing quantization to the array output signals $x(n)$ by using one-bit ADCs, the array output signals are one-bit signals and expressed as $y(n)$, which satisfies the target model of the one-bit quantization DoA estimation:

$$y(n)=\text{sgn}(\Re[x(n)])+j\text{sgn}(\Im[x(n)]),$$

where, $\Re[\cdot]$ and $\Im[\cdot]$ represent the real and the imaginary parts of a complex number, respectively, and $\text{sgn}(\cdot)$ is a sign function;

The one-bit output signals at the n-th snapshot is obtained by using independent identically distributed observation, where $Y=[y(1), y(2), \ldots, y(N)]\in \mathbb{C}^{M\times N}$, $\mathbb{C}$ represents the complex domain, the expression for the joint probability mass model is denoted by equation below:

$$p(Y;\alpha) = \prod_{n=1}^{N}\prod_{m=1}^{M} \Phi\left(\Re[y_{mn}]\frac{\sqrt{2}\,\Re[A_m s(n)]}{\sigma}\right)\Phi\left(\Im[y_{mn}]\frac{\sqrt{2}\,\Im[A_m s(n)]}{\sigma}\right),$$

where, $\alpha$ includes the parameters to be estimated, and $\alpha=[\theta,\sigma,s(1), \ldots, s(N)]^T$, $\sigma$ is the standard deviation of the noise, $A_m$ is the m-th row of the matrix A, $y_{mn}$ is the (m, n) element of the matrix Y, and $\Phi(\cdot)$ is the cumulative distribution function of the standard normal distribution.

Optionally, the step of deriving parameters to be estimated based on the joint probability mass model of one-bit quantization DoA estimation, comprises:

Taking the logarithm of both sides of the equation of the joint probability mass model at the same time to obtain the one-bit negative log likelihood function, the expression is denoted by equation below:

$$l(Y;\alpha) = \sum_{n=1}^{N}\sum_{m=1}^{M} -\ln\left(\Phi\left(\Re[y_{mn}]\frac{\sqrt{2}\,\Re[A_m s(n)]}{\sigma}\right)\right) - \ln\left(\Phi\left(\Im[y_{mn}]\frac{\sqrt{2}\,\Im[A_m s(n)]}{\sigma}\right)\right).$$

According to the maximum likelihood principle, minimizing the one-bit negative log likelihood function to obtain the estimated value $\hat{\alpha}$ of $\alpha$, the expression of $\hat{\alpha}$ is denoted by equation below:

$$\hat{\alpha} = \arg\min_{\alpha} \sum_{n=1}^{N}\sum_{m=1}^{M} f(\Re[y_{mn}]\Re[A_m z(n)]) + f(\Im[y_{mn}]\Im[A_{mn} z(n)])$$

where, $z(n)\triangleq \sqrt{2}s(n)/\sigma$, $f(x)\triangleq -\ln(\Phi(x))$, and $\triangleq$ represents "to be defined as".

Optionally, the step of based on the maximum likelihood principle and spatial row sparse property, constructing the optimization model based on the maximum likelihood principle by using the parameters to be estimated, comprises:

Dividing the signal space evenly into L search grids $\varphi=[\varphi_1, \varphi_2, \ldots, \varphi_L]^T$, where K is less than L, to obtain a manifold dictionary B, and $B=[a(\varphi_1), a(\varphi_2), \ldots, a(\varphi_L)]\in \mathbb{C}^{M\times L}$ Constructing a vector $u(n)$ with K sparsity in L×1, and the vector $u(n)$ is an extension of $z(n)$, and the expression of each element of $u(n)$ is denoted by equation below:

$$u_l(n) = \begin{cases} z_k(n), & \text{if } \varphi_l = \theta_k, \\ 0, & \text{otherwise,} \end{cases} l = 1, 2, \ldots, L; k = 1, 2, \ldots, K.$$

where, $u_l(n)$ represents the l-th element of $u(n)$, and $z_k(n)$ represents the k-th element of $z(n)$;

When there are N snapshots, a row sparse matrix U with K sparsity is obtained, and $U=[u(1), u(2), \ldots, u(N)]\in \mathbb{C}^{L\times N}$. Based on the row sparse matrix U with K sparsity, the estimated value $\hat{\alpha}$ of the parameter $\alpha$ is converted to be estimated into an optimization model $\hat{U}$ based on the maximum likelihood principle, the expression of $\hat{U}$ is denoted by equation below:

$$\hat{U} = \arg\min_{U} L(U) + \lambda\|U\|_{2,1},$$

where, λ represents controlled regular parameter used for balancing a fitting of likelihood term and a row sparsity of the matrix, and λ>0. $\|U\|_{2,1}$ represents $l_{2,1}$ norm of the matrix U, L(U) represents a likelihood function, and the expression of L(U) is denoted by equation below:

$$L(U) = \sum_{n=1}^{N}\sum_{m=1}^{M} f(\mathfrak{R}[y_{mn}]\mathfrak{R}[B_m u(n)]) + f(\mathfrak{I}[y_{mn}]\mathfrak{I}[B_m u(n)]).$$

Optionally, the step of: based on the optimization model, obtaining the steepest descent direction of the optimization model, comprises:

Calculating a conjugate gradient of L(U) and $\|U\|_{2,1}$ with respect to U by using the Wirtinger's calculus, to obtain conjugate gradient matrices ∂L(U)/∂U* and ∂$\|U\|_{2,1}$/∂U*;

Transforming and simplifying the conjugate gradient matrices ∂L(U)/∂U* and ∂$\|U\|_{2,1}$/∂U*, to obtain the steepest descent direction ΔU.

Optionally, the step of based on the steepest descent direction, solving the optimization model by steepest descent method to obtain the one-bit quantization DoA and the source number, comprises:

Based on the steepest descent direction ΔU, solving the optimization model by steepest descent method to obtain Û;

Calculating a normalized spatial power spectrum of Û, and obtaining the one-bit quantization DoA and the source number based on the positions and numbers of the peaks of the normalized spatial power spectrum.

The second aspect of the present disclosure provides a one-bit quantization DoA estimation system, comprising:

A one-bit quantization model constructing module used for: when a quantity of far-field and uncorrelated spatial narrow-band source signals are incident from different directions to a uniform linear array receiver, receiving the narrow-band source signals by a quantity of antenna array elements, expressing received signals at different times in matrix form and output signals of the quantity of antenna array elements in vector form, performing one-bit quantization to the received signals, and re-modeling the received signals after quantization to obtain a joint probability mass model of one-bit quantization DoA estimation;

An objective function optimizing module used for deriving parameters to be estimated based on the joint probability mass model of one-bit quantization DoA estimation;

An optimization model constructing module used for constructing an optimization model based on the maximum likelihood principle by using the parameters to be estimated based on the maximum likelihood principle and spatial row sparse property;

A steepest descent direction solving module used for obtaining a steepest descent direction of the optimization model based on the optimization model; and An optimization model solving module used for solving the optimization model by steepest descent method to obtain one-bit quantization DoA and source number based on the steepest descent direction of the optimization model.

The third aspect of the present disclosure provides an intelligent terminal, comprising: a memory, a processor, and an application stored in the memory, when the application is executed by the processor, the steps of the one-bit quantization DoA estimation method is implemented, which comprise:

When a quantity of far-field and uncorrelated spatial narrow-band source signals are incident from different directions to a uniform linear array receiver, receiving the narrow-band source signals by a quantity of antenna array elements, expressing received signals at different times in matrix form and output signals of the quantity of antenna array elements in vector form, performing one-bit quantization to the received signals, and re-modeling the received signals after quantization to obtain a joint probability mass model of one-bit quantization DoA estimation;

Deriving parameters to be estimated based on the joint probability mass model of one-bit quantization DoA estimation;

Based on the maximum likelihood principle and spatial row sparse property, constructing an optimization model based on the maximum likelihood principle by using the parameters to be estimated;

Based on the optimization model, obtaining a steepest descent direction of the optimization model;

Based on the steepest descent direction, solving the optimization model by steepest descent method to obtain one-bit quantization DoA and source number.

Compared with prior art, the beneficial effects of the present disclosure are as follows:

According to the present disclosure, the research object of the method is a quantity of far-field and uncorrelated spatial narrow-band source signals incident from different directions to a uniform linear array receiver. A quantity of antenna array elements receive the narrow-band source signals, and the vectors and matrices are used to model the received signals by one-bit quantization, to obtain a joint probability mass model of one-bit quantization DoA estimation. Then derive the maximum likelihood principle of the joint probability mass model of one-bit quantization DoA estimation, and construct the optimization model based on the maximum likelihood principle by using spatial row sparse property. Then solve the optimization model by the steepest descent method to obtain the one-bit quantization DoA and the source number. It should be understood that, according to the method of the present disclosure, steps of alternating iterative calculation in traditional one-bit quantization DoA estimation are omitted by constructing the optimization model based on the maximum likelihood principle and solving the same by steepest descent method, which leads to the simplification of the model solving complexity and the improvement of the estimation accuracy. Compared with the one-bit quantization DoA estimation method in the subspace relying on the Arcsine Law in the prior art, the method of the present disclosure provides higher estimation accuracy without the prior knowledge of source number. The method can jointly estimate the DoA and the source number, thus obviously improving the estimation accuracy and reducing the estimation cost.

BRIEF DESCRIPTION OF THE DRAWINGS

In order to more clearly explain the technical scheme in the embodiment of the present disclosure, brief description of the accompanying drawings needed in the embodiments or the prior art is shown below. Obviously, the drawings in the following description are only some embodiments of the present disclosure, and other drawings can be obtained according to these drawings without creative labor for those skilled in the field.

FIG. 1 is a schematic flowchart of a one-bit quantization DoA estimation method according to the present disclosure;

DETAILED DESCRIPTION OF THE EMBODIMENTS

Figure 2:
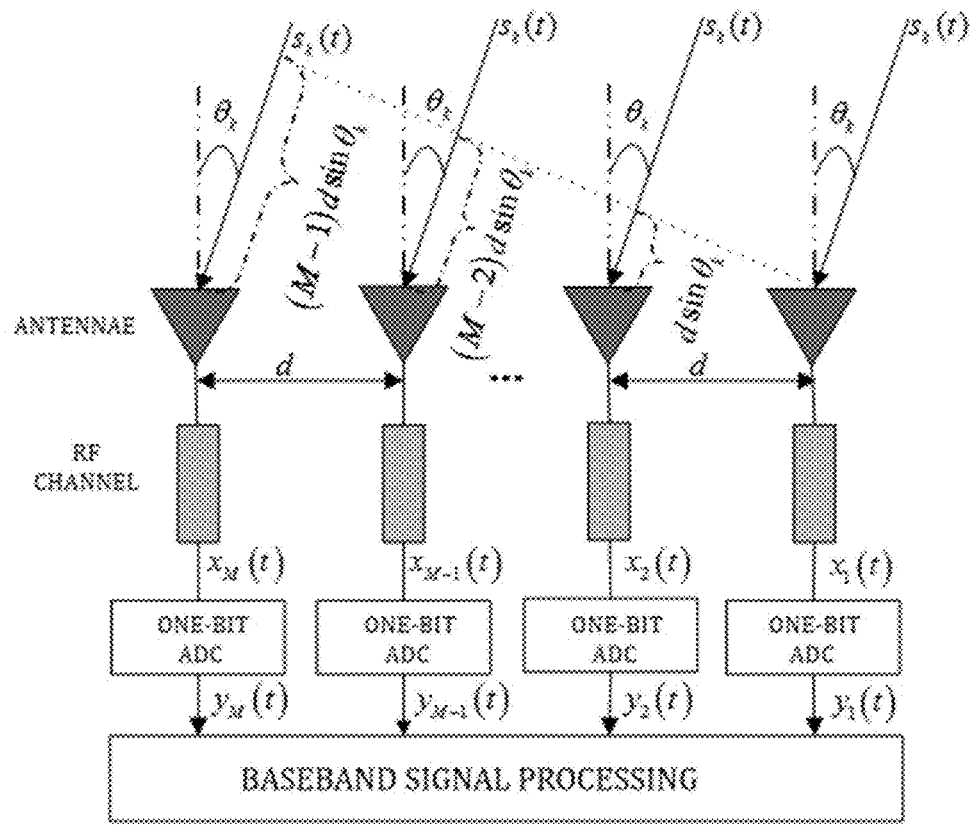
FIG. 2 is a structure diagram of a one-bit quantization DoA estimation system according to the present disclosure.

In the following description, specific details, such as specific system structure and technology, are set forth for the purpose of explanation rather than limitation, so as to provide thoroughly understanding of the embodiments of the present disclosure. However, it will be apparent to those skilled in the art that the present disclosure may be practiced in other embodiments without these specific details. In other cases, detailed descriptions of well-known systems, devices, circuits and methods are omitted so as not to obscure the description of the present disclosure with unnecessary details.

It should be understood that the terms "comprising" and "including", when used in the description and the appended claims, indicate the presence of the described features, integers, steps, operations, elements and/or components, but does not exclude the presence or addition of one or more other features, integers, steps, operations, elements, components and/or groups thereof.

It should also be understood that the terminology used in the description of the present disclosure is for the purpose of describing embodiments only and is not intended to limit the present disclosure. As used in the description of the present disclosure and the appended claims, singular forms of "a", "an" and "the" are intended to include plural forms unless the context clearly indicates otherwise.

It should be further understood that the term "and/or" used in the present description and the appended claims refers to any combination and all possible combinations of one or more of the associated listed items.

As used in this specification and the appended claims, the term "if" can be interpreted as "when" or "once" or "in response to determination" or "in response to detection" depending on the context. Similarly, the phrases "if determined" or "if the described condition or event is detected" can be interpreted as meaning "once determined" or "in response to determination" or "once the described condition or event is detected" or "in response to detection of the described condition or event" depending on the context.

In the following description, the technical scheme in the embodiments of the disclosure will be clearly and completely described with reference to the attached drawings. Obviously, the described embodiments are only part of the embodiments of the disclosure, but not the whole embodiments. Based on the embodiments in the present disclosure, all other embodiments obtained by those skilled in the art without creative labor belong to the scope of protection of the present disclosure.

In the following description, specific details are set forth in order to provide fully understanding of the present disclosure, but the present disclosure can also be implemented in other ways different from those described here, and those skilled in the art can make similar derivation without violating the connotation of the present disclosure, so the present disclosure is not limited by the specific embodiments disclosed below.

At present, for the subspace-based DoA estimation method rely on the Arcsine Law on small radar system equipped with one-bit ADCs, there is a need for the prior knowledge of accurate source number, otherwise there will be great estimation error. However, the source number is unknown in practical work, and cannot be used as prior knowledge, so it needs to be obtained by source number estimation. The traditional methods for estimating the source number, such as Akaike information theory principle, minimum description length principle and effective detection principle, cannot work in one-bit quantization scenes, which makes the methods difficult to realize. Therefore, the present disclosure proposes a one-bit quantization DoA estimation method aims at solving the problem of low estimation accuracy for the one-bit quantization DoA estimation method in the prior art. The method of the present disclosure mainly comprises follow steps: first, performing one-bit quantization to the received signals, and then constructing a joint probability mass model of one-bit quantization DoA estimation based on the received signals after quantization; next, based on the maximum likelihood principle and spatial row sparse property, optimizing the constructed model to obtain an optimization model based on the maximum likelihood principle; finally, solving the steepest descent direction of the optimization model by steepest descent method to obtain the one-bit quantization DoA estimation and the source number. Compared with the subspace-based DoA estimation that relies on Arcsine Law in the prior art, the method of the present disclosure omits steps of alternating iterative calculation in traditional one-bit quantization estimation by optimizing model and solving with the steepest descent direction, so there is no need for the prior knowledge of source number, which would greatly reduce the solution complexity and improve the DoA estimation accuracy. Moreover, the spatial power spectrum is adopted to not only realize the one-bit quantization DoA estimation, but also realize the accurate estimation of source number, which significantly improves the estimation accuracy and reduces the estimation cost.

Embodiment of the Method

An embodiment of the present disclosure provides a one-bit quantization DoA estimation method deployed on radar, sonar, satellite and other communication equipment, and applied to scenarios where a one-bit quantization DoA estimation to the signal is required. Specifically, as shown in FIG. 1, the steps of the method in the embodiment comprising:

S100: Receiving, when a quantity of far-field and uncorrelated spatial narrow-band source signals are incident from different directions to an uniform linear array receiver, the narrow-band source signals by a quantity of antenna array elements, expressing received signals at different time in matrix form and output signals of the quantity of antenna array elements in vector form, performing one-bit quantization to the received signals, and re-modeling the received signals after quantization to obtain a joint probability mass model of one-bit quantization DoA estimation.

Specifically, in the far-field radar system, when K spatial narrow-band source signals are incident from different directions with incident angles $\theta=[\theta_1, \theta_2, \ldots, \theta_K]^T$ to the antenna array receiver consisting of M array elements with arbitrary directionalities, the distance between two array elements is d and the wavelength of the source signal is v. The K spatial narrow-band source signals are not correlated with each other and are definite signals. The rightmost array element is used as the reference array element for the array, therefore, the DoA of the source signal can be represented by the angle between the signal transmitting direction and the array normal direction. As shown in FIG. 2 is the structure diagram of the one-bit quantization DoA estimation system, the schematic process of signal incidence, signal one-bit quantization and signal processing are illustrated, wherein, $s_k(t)$ represents the k-th source signal incident to each array element in the antenna array; taking the rightmost array element as the reference array element for the array, the DoA of the source signal can be represented by the angle between the signal transmitting direction and the array normal direction, that is, $\theta_k$. All array elements are arranged according to the distance between two array elements, and in order to avoid phase ambiguity, the distance d should be less than or equal to half the wavelength v of the incident signal. After being received by the array element, the source signals are transmitted to the corresponding one-bit ADC unit, respectively, through each corresponded Radio Frequency Channel (RF Channel), $x_m(t)(m=1, 2, \ldots, M)$ represents the output signal of the m-th array element at the n-th snapshot, and $y_m(t)$ represents the output signal of the m-th one-bit ADC at the n-th snapshot. Then $y_m(t)$ is transmitted to the Baseband Signal Processing unit for subsequent one-bit quantization DoA estimation.

It is worth noting that for the antenna array. DoA is limited to $-90°\sim90°$ and that is $\theta_k \in [-90°, 90°]$, k=1, 2, ..., K.

The expression for the output signal $x_m(n)$ of the m-th array element of the antenna array at the n-th snapshot is denoted by Equation (1) below:

$$x_m(n) = \sum_{k=1}^{K} s_k(n) e^{j2\pi \frac{(m-1)d\sin\theta_k}{v}} + \epsilon_m(n), m = 1, 2, \ldots, M \quad (1)$$

where, $s_k(n)$ is the k-th source signal incident to the array, $\epsilon_m(n)$ is the additive noise of the m-th array element, $j=\sqrt{-1}$ is the imaginary unit, e is the base of the natural logarithm, v is the wavelength of the source signal, d is the distance between adjacent array elements of the uniform linear array receiver, M is the number of the uniform linear array receivers, and T represents transposition. It is easy to understand that the parameters of the present disclosure, such as the source signals number K, the array elements number M, and the number of the search lattices L, are all positive integers.

Arranging the output signals of M array elements at the n-th snapshot to obtain a column vector, Equation (2) is denoted as below:

$$x(n)=As(n)+\epsilon(n) \quad (2)$$

where, x(n) is the output signal vector for the M×1 dimension of the array, and $x(n)=[x_1(n), x_2(n), \ldots, x_M(n)]^T$; E(n) is the additive noise vector for the M×1 dimension of the array, and $\epsilon(n)=[\epsilon_1(n), \epsilon_2(n), \ldots, \epsilon_M(n)]^T$; s(n) is the spatial source signal for the K×1 dimension, and $s(n)=[s_1(n), s_2(n), \ldots, s_K(n)]^T$; and A is a manifold matrix for the M×K dimension, and $A=[a(\theta_1), a(\theta_2), \ldots, a(\theta_K)]$, and the steering vector of the k-th source signal is the M×1 dimensional vector. The expression for $a(\theta_k)$ is denoted by Equation (3) below:

$$a(\theta_k) = \left[1, e^{j2\pi \frac{d\sin\theta_k}{v}}, \ldots, e^{j2\pi \frac{(M-1)d\sin\theta_k}{v}}\right]^T \quad (3)$$

where, additive noise vector, $\epsilon(n)\sim CN(0,\sigma^2 I_M)$, represents that E(n) follows complex circular Gaussian distribution with a mean value of all-zero vector 0 in M×1 dimension and a covariance matrix of $\sigma^2 I_M$, among which $\sigma^2$ is a variance of the noise, and $I_M$ represents the identity matrix of the M×M dimension and is independent of the source signals.

When performing quantization to the array output signals x(n) by using one-bit ADCs, the array output signals are one-bit signals and expressed as y(n), which satisfies the target model of the one-bit quantization DoA estimation, the expression for y(n) is denoted by Equation (4) below:

$$y(n)=\text{sgn}(\Re[x(n)])+j\text{sgn}(\Im[x(n)]) \quad (4)$$

where, $\Re[\cdot]$ and $\Im[\cdot]$ represent the real and the imaginary parts of the complex number, respectively, and $\text{sgn}(\cdot)$ is a sign function, and the expression is denoted by Equation (5) below:

$$\text{sgn}(x) = \begin{cases} -1, & x < 0, \\ 1, & x \geq 0 \end{cases} \quad (5)$$

Based on the additive noise assumption of step S100, the one-bit output signal y(n) follows a multivariate discrete distribution, and the probability mass function can be obtained by performing a multivariate integral on the real and imaginary parts of the unquantized output signal x(n). The one-bit output signals at the n-th snapshot $Y=[y(1), y(2), \ldots, y(N)] \in \mathbb{C}^{M \times N}$ are obtained by using independent and identically distributed observation, where $\mathbb{C}$ represents the complex domain. The expression for the joint probability mass function is denoted by Equation (6) below:

$$p(Y; \alpha) = \prod_{n=1}^{N} \prod_{m=1}^{M} \Phi\left(\Re[y_{mn}] \frac{\sqrt{2}\Re[A_m s(n)]}{\sigma}\right) \Phi\left(\Im[y_{mn}] \frac{\sqrt{2}\Im[A_m s(n)]}{\sigma}\right) \quad (6)$$

where, $\alpha$ includes the parameters to be estimated, and $\alpha=[\theta,\sigma,s(1), \ldots, s(N)]^T$, $\sigma$ is the standard deviation of the noise, $A_m$ is the m-th row of the matrix A, $y_{mn}$ is the (m, n) element of the matrix Y, and $\Phi(\cdot)$ is the cumulative distribution function of the standard normal distribution, and is denoted by Equation (7) below:

$$\Phi(x) = \frac{1}{\sqrt{2\pi}} \int_{-\infty}^{x} e^{-\frac{t^2}{2}} dt \quad (7)$$

S200: Deriving parameters to be estimated based on the joint probability mass model of one-bit quantization DoA estimation.

Specifically, based on Equation (6) obtained in step S100, taking the logarithm of both sides of the Equation (6) at the same time to obtain a one-bit negative log likelihood function, the expression is denoted by Equation (8) below:

$$l(Y;\alpha) = \sum_{n=1}^{N}\sum_{m=1}^{M} -\ln\left(\Phi\left(\Re[y_{mn}]\frac{\sqrt{2}\Re[A_m s(n)]}{\sigma}\right)\right) - \ln\left(\Phi\left(\mathcal{J}[y_{mn}]\frac{\sqrt{2}\mathcal{J}[A_m s(n)]}{\sigma}\right)\right) \quad (8)$$

According to the maximum likelihood principle, minimizing the one-bit negative log likelihood function of $\alpha$ to obtain the estimated value $\hat{\alpha}$ of $\alpha$, the expression of $\hat{\alpha}$ is denoted by Equation (9) below:

$$\hat{\alpha} = \arg\min_{\alpha} \sum_{n=1}^{N}\sum_{m=1}^{M} f(\Re[y_{mn}]\Re[A_m z(n)]) + f(\mathcal{J}[y_{mn}]\mathcal{J}[A_m z(n)]) \quad (9)$$

where, $z(n) \triangleq \sqrt{2}s(n)/\sigma$, $f(x) \triangleq -\ln(\Phi(x))$, and $\triangleq$ represents "to be defined as".

S300: Constructing, based on maximum likelihood principle and spatial row sparse property, an optimization model based on the maximum likelihood principle by using the parameters to be estimated.

Specifically, it is very challenging to solve the optimization problem of Equation (9), because the optimization model is nonconvex regarding $\theta$. The following describes transforming Equation (9) into the recovery problem of a row sparse matrix based on maximum likelihood:

Firstly, dividing the potential signal space evenly into L search grids $\varphi = [\varphi_1, \varphi_2, \ldots, \varphi_L]^T$, where K is much less than L to satisfy the sparse condition of the signal space (Usually L is over 10 times greater than K, K and L are both positive integers). A complete dictionary B is obtained, and $B = [a(\varphi_1), a(\varphi_2), \ldots, a(\varphi_L)] \in \mathbb{C}^{M \times L}$. Accordingly, a vector $u(n)$ in $L \times 1$ can be constructed, and $u(n)$ is an extension of $z(n)$, each element of $u(n)$ is denoted by Equation (10) below:

$$u_l(n) = \begin{cases} z_k(n), & \text{if } \varphi_l = \theta_k, \\ 0, & \text{otherwise,} \end{cases} l = 1, 2, \ldots, L; k = 1, 2, \ldots, K \quad (10)$$

where, $u_l(n)$ represents the l-th element of $u(n)$, and $z_k(n)$ represents the k-th element of $z(n)$. As can be seen from Equation (10), $u(n)$ only has K non-zero elements, and the rest are all zero elements, and the positions of the non-zero elements correspond to the real DoA, respectively, that is, $u(n)$ is a K sparse vector.

When there are N snapshot signals, $u(n)(n=1, 2, \ldots, N)$ is joint sparse and has a common support set. In other words, $u(n)$ can be used for constructing a row sparse matrix U with K sparsity, and $U = [u(1), u(2), \ldots, u(N)] \in \mathbb{C}^{L \times N}$, that is, U represents a row sparse matrix with only K non-zero rows, and the other rows are all-zero. Therefore, in the optimization problem of Equation (9), from the perspective of sparse signal recovery, the estimated parameter $\hat{\alpha}$ of $\alpha$ can be simplified as the optimization model $\hat{U}$ based on the maximum likelihood principle, and the expression of $\hat{U}$ is denoted by Equation (11) below:

$$\hat{U} = \arg\min_{U} L(U) + \lambda \|U\|_{2,1} \quad (11)$$

where, $L(U)$ represents a likelihood function, namely, an optimization model based on the maximum-likelihood principle, and the expression of $L(U)$ is denoted by Equation (12) below:

$$L(U) = \sum_{n=1}^{N}\sum_{m=1}^{M} f(\Re[y_{mn}]\Re[B_m u(n)]) + f(\mathcal{J}[y_{mn}]\mathcal{J}[B_m u(n)]) \quad (12)$$

where, $B_m$ represents the m-th row of matrix B, and $\|U\|_{2,1}$ represents the $l_{2,1}$ norm of the matrix U, which is a convex function about U and is a special case for the $l_{r,p}$ norm of matrix. The mathematical definition of the $l_{r,p}$ norm of the matrix is as Equation (13) below:

$$\|U\|_{r,p} = \left[\sum_{m=1}^{M}\left(\sum_{n=1}^{N}|u_{mn}|^r\right)^{\frac{p}{r}}\right]^{\frac{1}{p}} \quad (13)$$

where, $|\cdot|$ represents the absolute value operation, and r and p are set as positive real numbers. When r=2, p=1, that is the $l_{2,1}$ norm of the matrix U. While, $\lambda > 0$ represents controlled regular parameter used for balancing the fitting of likelihood term and the row sparsity of the matrix.

Observing the objective function in the Equation (10), it can be found that it is a convex function. Although the function can be solved by CVX optimization toolbox, the computational complexity is very high and there is no closed-form solution. In the present embodiment, the steepest descent method is adopted to derive the iterative closed analytical solution, which can effectively reduce the computational complexity. The specific derivation process is as follows:

S400: Obtaining, based on the optimization model, a steepest descent direction of the optimization model.

Specifically, the steepest descent direction needs to be calculated before using the steepest descent method. The steepest descent direction is derived from the conjugate gradient of $L(U)$ and $\|U\|_{2,1}$ about U, that is the conjugate gradient matrices $\partial L(U)/\partial U^*$ and $\partial \|U\|_{2,1}/\partial U^*$. According to the prior art, the expression of $\partial \|U\|_{2,1}/\partial U^*$ is denoted by Equation (14) below:

$$\frac{\partial \|U\|_{2,1}}{\partial U^*} = \frac{1}{2}DU \quad (14)$$

where, $$D = \text{diag}\left(\frac{1}{\|U_1\|_2}, \frac{1}{\|U_2\|_2}, \ldots, \frac{1}{\|U_L\|_2}\right) \quad (15)$$

where, $\text{diag}(\cdot)$ represents generating diagonal matrix; and $\|\cdot\|_2$ represents $l_2$ norm of a vector.

For $\partial L(U)/\partial U^*$, firstly, solving the partial derivative of $L(U)$ with respect to $u_{pq}^*$, the expression is denoted by Equation (16) below:

$$\frac{\partial L(U)}{\partial u_{pq}^*} = \sum_{n=1}^{N}\sum_{m=1}^{M} f'(\Re[y_{mn}]\Re[B_m u(n)])\Re[y_{mn}]\frac{\partial \Re[B_m u(n)]}{\partial u_{pq}^*} + \quad (16)$$

-continued $$f'(\mathfrak{J}[y_{mn}]\mathfrak{J}[B_m u(n)])\mathfrak{J}[y_{mn}]\frac{\partial \mathfrak{J}[B_m u(n)]}{\partial u_{pq}^*}$$

where, * is the conjugate operator, $u_{pq}*$ is a conjugate of p-th row and q-th column in the matrix U, and f'(·) is the derivative of f(·), and the expression is denoted by Equation (17) below:

$$f'(x) = -\frac{1}{\sqrt{2\pi}\Phi(x)}e^{-\frac{x^2}{2}} \quad (17)$$

Next, using the Wirtinger's calculus and considering identity equations $\mathfrak{R}[B_m u(n)] = \mathfrak{R}[B_m]\mathfrak{R}[u(n)] - \mathfrak{J}[B_m]\mathfrak{J}[u(n)]$ and $\mathfrak{J}[B_m u(n)] = \mathfrak{R}[B_m]\mathfrak{J}[u(n)] + \mathfrak{J}[B_m]\mathfrak{R}[u(n)]$, Equation (18) can be obtained below:

$$\begin{aligned}\frac{\partial \mathfrak{R}[B_m u(n)]}{\partial u_{pq}^*} &= \frac{1}{2}\frac{\partial \mathfrak{R}[B_m u(n)]}{\partial \mathfrak{R}[u_{pq}]} + \frac{j}{2}\frac{\partial \mathfrak{R}[B_m u(n)]}{\partial \mathfrak{J}[u_{pq}]} \\ &= \frac{1}{2}\frac{\partial \mathfrak{R}[B_m]R[u(n)]}{\partial \mathfrak{R}[u_{pq}]} + \frac{j}{2}\frac{\partial \mathfrak{J}[B_m]\mathfrak{J}[u(n)]}{\partial \mathfrak{J}[u_{pq}]} \\ &= \frac{1}{2}\frac{\partial \sum_{l=1}^{L}\mathfrak{R}[b_{ml}]\mathfrak{R}[u_{ln}]}{\partial \mathfrak{R}[u_{pq}]} - \frac{j}{2}\frac{\partial \sum_{l=1}^{L}\mathfrak{J}[b_{ml}]\mathfrak{J}[u_{ln}]}{\partial \mathfrak{J}[u_{pq}]} \\ &= \frac{1}{2}\mathfrak{R}[b_{mp}] - \frac{j}{2}\mathfrak{J}[b_{mp}] = \frac{1}{2}b_{mp}^*\end{aligned} \quad (18)$$

where, $u_{pq}$ represents the element of the matrix U in p-th row and q-th column, $b_{ml}$ represents the element of the manifold dictionary B in m-th row and l-th column, $u_{ln}$ represents the element of the row sparse matrix U in l-th row and n-th column, $b_{mp}$ represents the element of the manifold dictionary B in m-th row and p-th column, and $b_{mp}$ represents the conjugation of $b_{mp}$.

Similarly, Equation (19) can be obtained below:

$$\frac{\partial \mathfrak{J}[B_m u(n)]}{\partial u_{pq}^*} = \frac{j}{2}b_{mp}^* \quad (19)$$

Taking the Equation (18) and the Equation (19) into the Equation (16), and simplifying the Equation (16) to obtain Equation (20) below:

$$\frac{\partial L(U)}{\partial u_{pq}^*} = \sum_{m=1}^{M}\frac{b_{mp}^*}{2}f'(\mathfrak{R}[y_{mn}]\mathfrak{R}[B_m u(n)])\mathfrak{R}[y_{mn}] + \quad (19)$$

$$j\frac{b_{mp}^*}{2}f'(\mathfrak{J}[y_{mn}]\mathfrak{J}[B_m u(n)])\mathfrak{J}[y_{mn}]$$

Finally, the expression of the conjugate gradient matrix ∂L(U)/∂U* is denoted by Equation (21) below:

$$\frac{\partial L(U)}{\partial U^*} = \quad (20)$$

$$\frac{1}{2}B^H f'(\mathfrak{R}[Y]\odot\mathfrak{R}[BU])\odot\mathfrak{R}[Y] + \frac{j}{2}B^H f'(\mathfrak{J}[Y]\odot\mathfrak{J}[BU])\odot\mathfrak{J}[Y]$$

In the Equation (21), ⊙ represents the Hadamard product, and $B^H$ represents the conjugate transpose of B.

Therefore, the expression of the steepest descent direction ΔU is denoted by Equation (22) below:

$$\Delta U = \frac{1}{2}B^H f'(\mathfrak{R}[Y]\odot\mathfrak{R}[BU])\odot\mathfrak{R}[Y] + \quad (21)$$

$$\frac{j}{2}B^H f'(\mathfrak{J}[Y]\odot\mathfrak{J}[BU])\odot\mathfrak{J}[Y] + \frac{\lambda}{2}DU$$

S500: Solving, based on the steepest descent direction of the optimization model, the optimization model by steepest descent method to obtain a one-bit quantization DoA and a source number.

Solving the Equation (11) by steepest descent method after acquiring the steepest descent direction to obtain the Equation (23):

$$U^{r+1} = U^r - \eta\Delta U \quad (23)$$

where, r and η represent the r-th iteration and the η step-size, respectively.

By setting the times of iterations to complete the steepest descent method, the solution Û of equation (11) is obtained, which is also the solution of the optimization model. Then the normalized spatial power spectrum of Û is calculated, the expression is denoted by Equation (24) below:

$$p(l) = \frac{\|\hat{U}_l\|_2^2}{\max_{l=1,2,\ldots,L}\|\hat{U}_l\|_2^2}, l = 1, 2, \ldots, L \quad (24)$$

where, $\|\hat{U}_l\|_2^2$ is the normalized spatial power spectrum of Û in l-th column.

The one-bit quantization DoA and the source number are obtained by recognizing the positions and numbers of the peaks of the normalized spatial power spectrum.

Furthermore, the embodiment can also be applied to other fields that need to estimate the source number and the incident angle of signals, such as electronics, mobile communication, sonar, aerospace and satellite communication, i.e., 5G large-scale antenna communication and array antenna satellite navigation.

It should be noted that in the radar system of the present embodiment, the receiving device for receiving the source signals is a uniform linear array receiver, and as other embodiments, a sparse array receiver can also be selected as the receiving device. Any receiving device that is applicable to implement the one-bit quantization DoA estimation of the present disclosure and can realize DoA estimation of the spatial narrow-band source signal should be considered to fall within the protection scope of the present disclosure, and no further limitation is stated.

Compared with the prior art, the method of the present disclosure has smaller estimation error and better estimation performance. Compared with the subspace-based DoA estimation method relying on the Arcsine Law, the present disclosure estimates DoA source number jointly without the prior knowledge, and has higher probability of success in estimating the source number.

Next, the method proposed by the present disclosure is simulated and tested, and compared with several approaches such as One-bit Multiple Signal Classification (One-bit MUSIC), Off-Grid Iterative Reweighted (OGIR), Generalized Sparse Bayesian Learning (Gr-SBL), and Atomic Norm Denoising (AND). For example, a uniform linear array of 15 array elements is used, and the distance between adjacent antenna elements is half the wavelength of radar signal. Suppose that the radar system has three targets, the waveform is $$s(n) = \left[ e^{\frac{j}{30}n}, e^{\frac{j}{6}n}, e^{\frac{j4}{15}n} \right]^T,$$

incident to the uniform linear array from direction θ=[−33°, 2°, 23°]$^T$. The potential target interval is φ=[−90°, 90°]$^T$, divided at equal intervals in 0.1°, that is L=1081. In the steepest descent technology, the step size n and iteration times R are set as 0.1 and 500 respectively, and the initial value U$^0$ is a random matrix. The Signal-to-Noise Ratio (SNR) in the present disclosure is defined by the following expression of Equation (25):

$$SNR_k = 10\log_{10}\left(\frac{\sum_{n=1}^{N}|s_k(n)|^2}{N\sigma^2}\right) \quad (25)$$

where, SNR$_k$ is the signal-to-noise ratio of the k-th target, and s$_k$(n) is the k-th element of s(n).

In addition, the present disclosure adopts Root Mean Square Error (RMSE) and Probability of Success (POS) as performance evaluation indicators, which are denoted by Equation (26) and Equation (27) below:

$$RMSE = \sqrt{\frac{1}{100K}\sum_{w=1}^{100}\sum_{k=1}^{K}(\theta_k - \hat{\theta}_{w,k})^2} \text{ and} \quad (26)$$

$$PoS = \frac{P}{100} \times 100\% \quad (27)$$

In the Equation (26) and Equation (27), $\hat{\theta}_{w,k}$ is the estimated value of the k-th DoA by w-th simulation, and P represents the number of times that the source number is estimated successfully. The so-called source number estimated successfully means that the estimated source number is equal to the true source number of the target.

Figure 3:
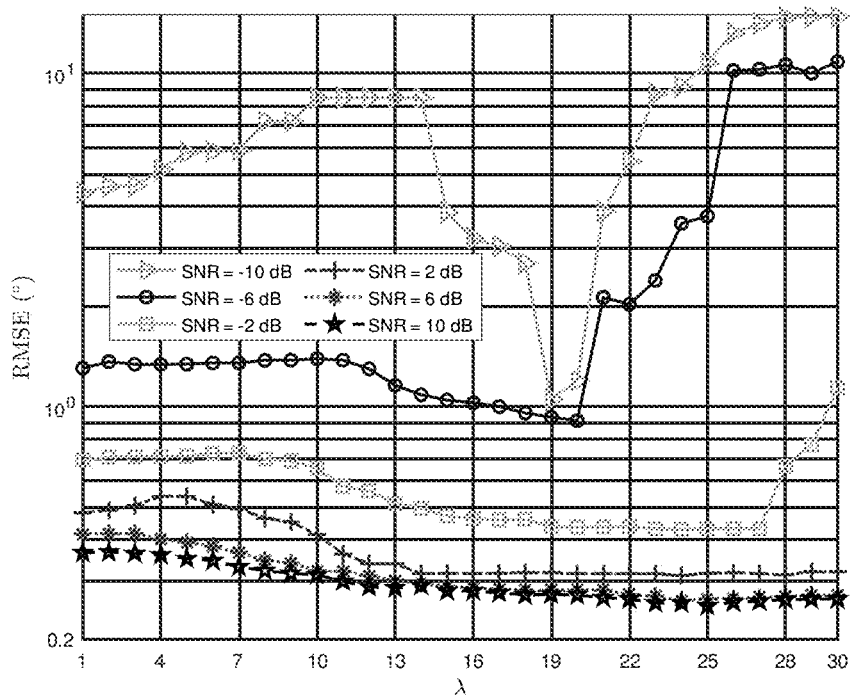
FIG. 3 is a schematic diagram of the simulation curve of RMSE versus λ in the cases of different SNRs according to the present disclosure when the number of snapshots is set as 20.

FIG. 3 is a schematic diagram of the curve of RMSE versus A in the cases of different SNR when the number of snapshots is set as 20. In order to obtain the optimal estimation performance, optimal λ as 19, 20, 24, 24, 24 and 24 are selected corresponding to the SNR as −10 dB, −6 dB, −2 dB, 2 dB, 6 dB and 10 dB, respectively.

Figure 4:
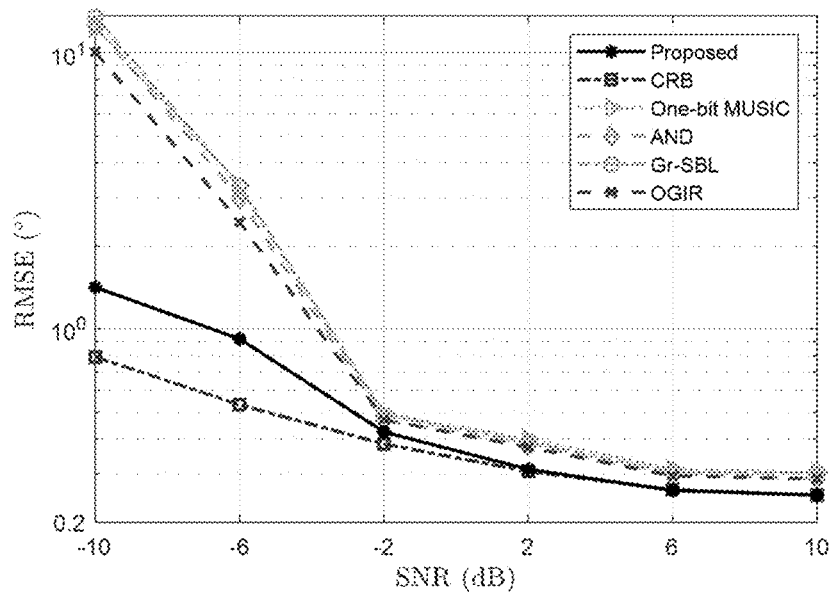
FIG. 4 is a schematic diagram of the simulation curve of RMSE versus SNR according to the present disclosure when the number of snapshots is set as 20.

FIG. 4 is a schematic diagram of the curve of RMSE versus SNR when optimal A is selected and the number of snapshots is set as 20. Obviously, the RMSE of all methods decreases with the increase of SNR, but the RMSE of the present disclosure is always the smallest in the whole SNR range, which shows that the performance of the present disclosure is the best among all the existing methods. The advantage is extremely obvious when the SNR is smaller than −2 dB. In addition, the RMSE of the present disclosure reaches the lower bound of Cramer-Rao Bound (CRB) when the SNR is greater than −2 dB.

Figure 5:
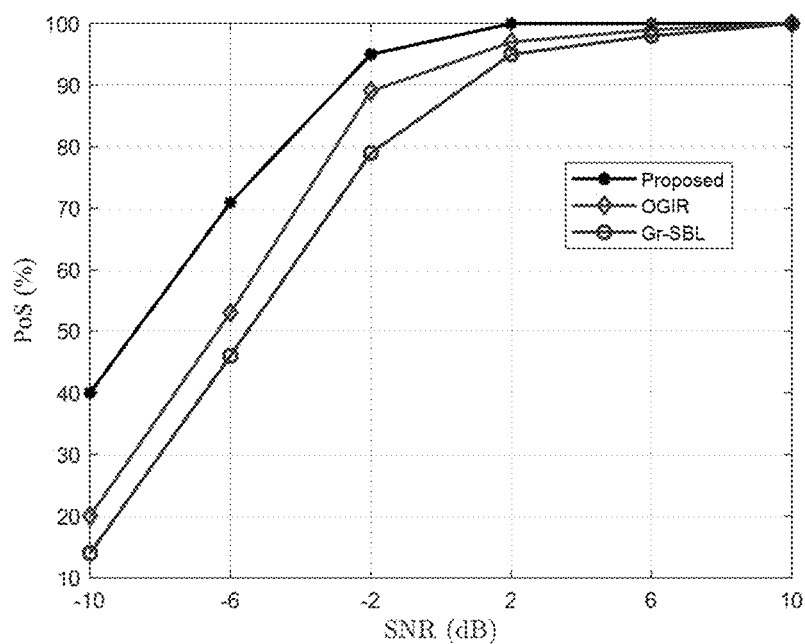
FIG. 5 is a schematic diagram of the simulation curve of POS (Probability of Success) versus SNR according to the present disclosure when the number of snapshots is set as 20.

FIG. 5 is a schematic diagram of the curve of POS versus SNR when the number of snapshots is set as 20. Obviously, the present disclosure has the highest PoS in the tested SNR range, indicating that the source number estimation performance of the present disclosure is better than other existing methods.

Figure 6:
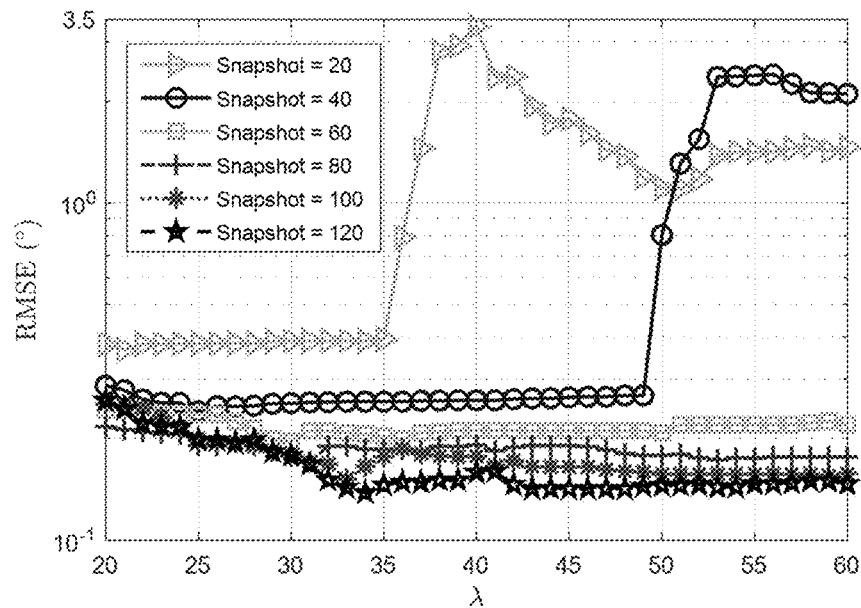
FIG. 6 is a schematic diagram of the simulation curve of RMSE versus A under different number of snapshots according to the present disclosure for SNR is 0 dB.

FIG. 6 is a schematic diagram of the curve of the RMSE versus λ under different snapshots for SNR is 0 dB. As shown in the FIG. 6, when the number of snapshots is greater than 80, the choice of λ has less influence on the RMSE, and it shows that every time the number of snapshots increases by 20, the optimal λ value increases by 1. As a result, when the number of snapshots is 20, the optimal λ value is 19, and when the number of snapshots increases by 20, the optimal λ value increases by 1.

Figure 7:
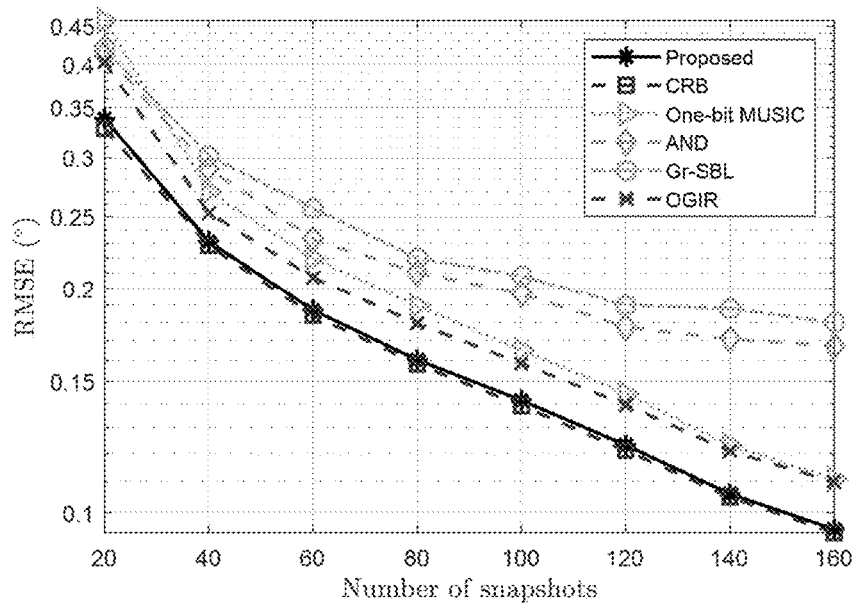
FIG. 7 is a schematic diagram of the simulation curve of RMSE versus the number of snapshots according to the present disclosure for SNR is 0 dB.

FIG. 7 is a schematic diagram of the curve of the RMSE versus the number of snapshots after selecting optimal λ value for SNR is 0 dB. Effortlessly, the RMSE of the present disclosure is always the smallest in the whole range of test snapshots, indicating that the performance of the present disclosure is the best among all the existing methods, and can reach the lower bound CRB of theoretical performance.

Embodiment of the System

Figure 8:
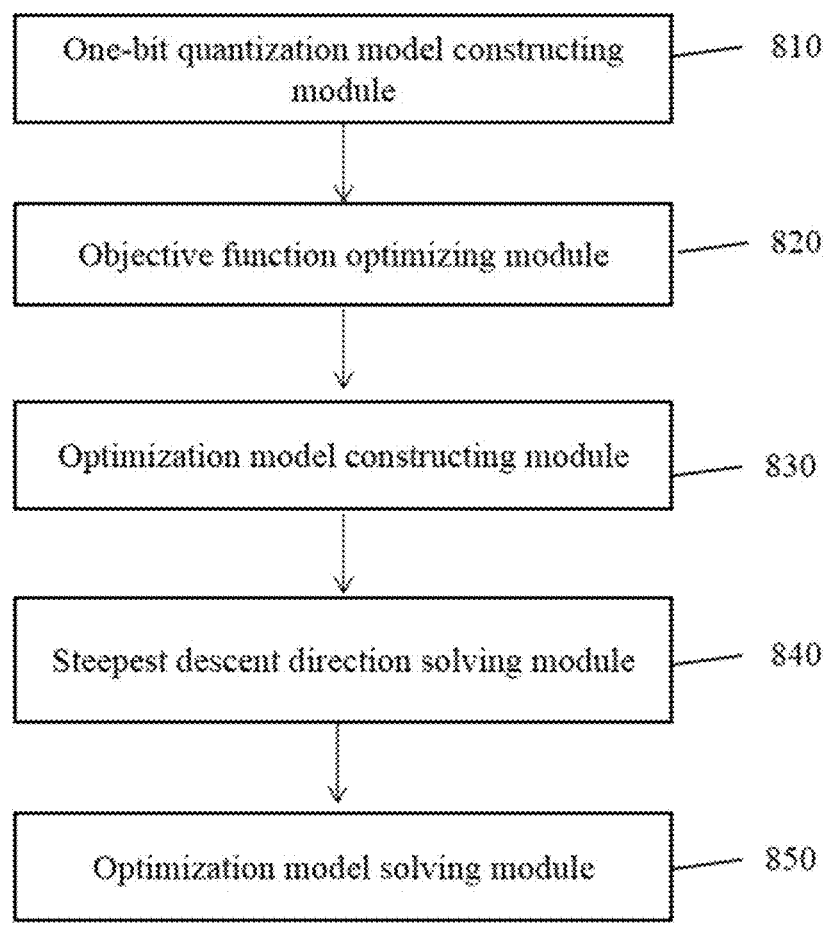
FIG. 8 is a structural schematic diagram of a one-bit quantization DoA estimation system according to the present disclosure.

As show in FIG. 8, an embodiment of the present disclosure can also provide a one-bit quantization DoA estimation system corresponding to the above one-bit quantization DoA estimation method, which comprises:

A one-bit quantization model constructing module 810 used for when a quantity of far-field and uncorrelated spatial narrow-band source signals are incident from different directions to a uniform linear array receiver, receiving the narrow-band source signals by a quantity of antenna array elements, expressing received signals at different times in matrix form and output signals of the quantity of antenna array elements in vector form, performing one-bit quantization to the received signals, and re-modeling the received signals after quantization to obtain a joint probability mass model of one-bit quantization DoA estimation;

An objective function optimizing module 820 used for deriving parameters to be estimated based on the joint probability mass model of one-bit quantization DoA estimation;

An optimization model constructing module 830 used for constructing an optimization model based on the maximum likelihood principle by using the parameters to be estimated based on the maximum likelihood principle and spatial row sparse property;

A steepest descent direction solving module 840 used for obtaining a steepest descent direction of the optimization model based on the optimization model; and An optimization model solving module 850 used for solving the optimization model by steepest descent method to obtain the one-bit quantization DoA and the source number based on the steepest descent direction of the optimization model.

Specifically, in the present embodiment, the functions of the above-mentioned one-bit quantization DoA estimation system can also refer to the corresponding description in the above-mentioned one-bit quantization DoA estimation method, which is not repeated here.

Figure 9:
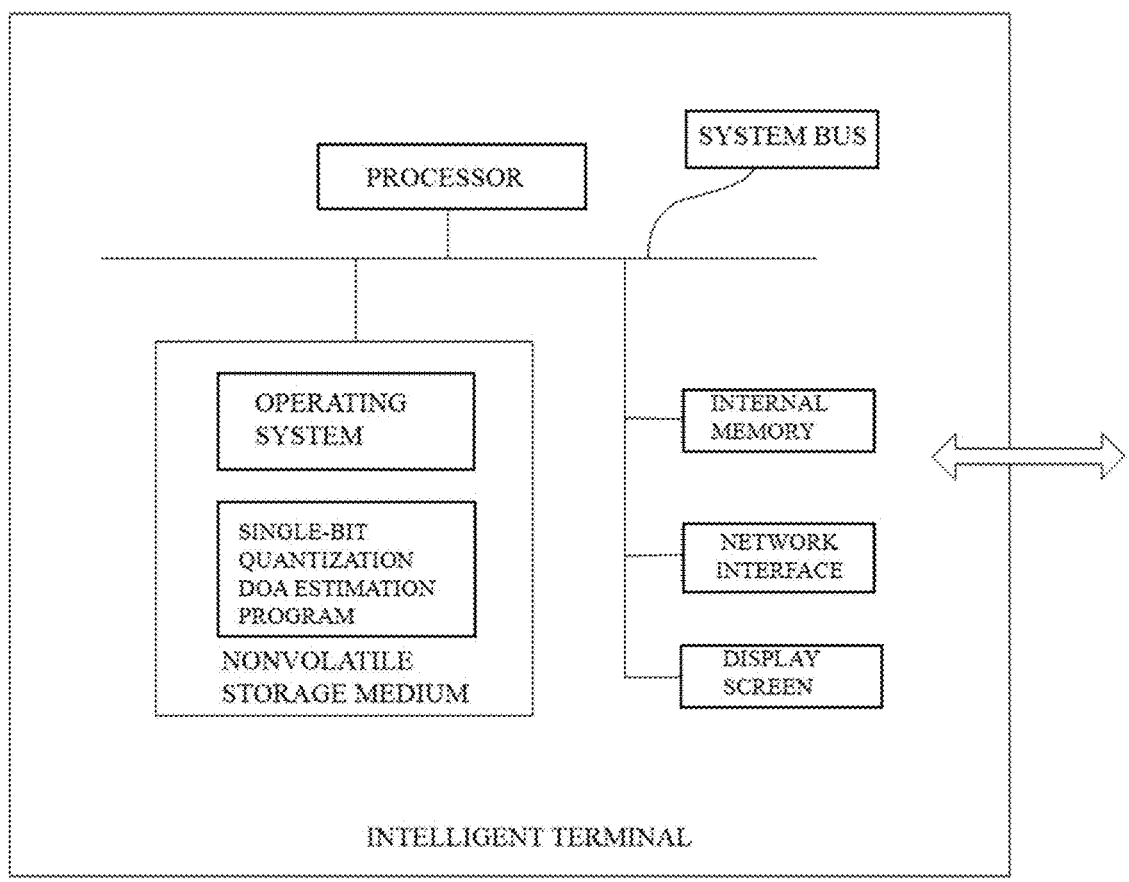
FIG. 9 is a schematic block diagram of an intelligent terminal according to the present disclosure.

Based on the above-mentioned embodiments, the present disclosure can also provide an intelligent terminal, the schematic block diagram of the intelligent terminal can be shown in FIG. 9. The intelligent terminal includes a processor, a memory, a network interface and a display screen which are connected with a system bus. The processor of the intelligent terminal is used to provide computing and controlling capabilities. The memory of the intelligent terminal includes a nonvolatile storage medium and an internal memory. The nonvolatile storage medium stores an operating system and a one-bit quantization DoA estimation program. The internal memory provides an environment for implementing the operating system and the one-bit quantization DoA estimation program in the nonvolatile storage medium. The network interface of the intelligent terminal is used to communicate with external terminals through network connection. When the one-bit quantization DoA estimation program is executed by the processor, the steps the above one-bit quantization DoA estimation method are realized. The display screen of the intelligent terminal can be a liquid crystal display screen or an electronic ink display screen.

It should be understood by those skilled in the art that the schematic block diagram shown in FIG. 9 is only a block diagram of a part of the structure related to the scheme of the present disclosure, and does not constitute a limitation on the intelligent terminal to which the scheme of the present disclosure is applied. A specific intelligent terminal may include more or less components than those shown in the drawing, or some components can be combined, or different component arrangements can be provided.

In one embodiment, an intelligent terminal is provided, which comprises a memory, a processor, and a one-bit quantization DoA estimation program stored in the memory and executed by the processor. When the one-bit quantization DoA estimation program is executed by the processor, the steps of the one-bit quantization DoA estimation method provided by the embodiment of the present disclosure are implemented.

It should be understood that the sequence number of each step in the above-mentioned embodiment does not mean the order of execution, and the order of execution of each process should be determined according to the function and internal logic, and should not constitute any restrictions on the implementation process of the embodiment of the present disclosure.

It should be clearly understood by those skilled in the art that for the convenience and conciseness of description, only the division of the above-mentioned functional units and modules is taken as an example. In practical application, the above-mentioned function allocation can be completed by different functional units and modules as required, that is, the internal structure of the above-mentioned device is divided into different functional units or modules to complete all or part of the above-mentioned functions. Each functional unit and module in the embodiment can be integrated into one processing unit, or each unit can exist physically alone, or two or more units can be integrated into one unit. The integrated units can be realized in the form of hardware or software functional units. In addition, the specific names of each functional unit and module are only for the convenience of distinguishing each other, and are not used to limit the protection scope of the present disclosure. The specific working processes of the units and modules in the above-mentioned system can refer to the corresponding processes in the above-mentioned method embodiments, and will not be repeated here.

In the above-mentioned embodiments, the description of each embodiment has own emphasis. For the parts that are not detailed or recorded in one embodiment, please refer to the relevant descriptions of other embodiments.

Those skilled in the art should note that the units and algorithm steps of various examples described in the embodiments disclosed herein can be implemented in electronic hardware, or a combination of computer software and electronic hardware. Whether these functions are implemented in hardware or software depends on the specific application and design constraints of the technical scheme. Those skilled in the art can use different methods to realize the described functions for each specific application, but such realization should not be considered beyond the scope of the present disclosure.

In the embodiments provided by the present disclosure, it should be understood that the disclosed device/terminal device and method can be realized in other ways. For example, the device/terminal device embodiment described above is only schematic. For example, the division of the above modules or units is only a logical function division, which can be realized by another division method. For example, multiple units or components can be combined or integrated into another system, or some features can be ignored or not implemented.

The embodiments described above are only used to illustrate the technical scheme of the present disclosure, but not to limit it. Although the present disclosure has been described in detail with reference to the foregoing embodiments, it should be understood by those skilled in the art that any modification of the technical scheme described in the previous embodiments or replacement of some technical features can be made. However, those modifications or replacements that still fall within the spirit and scope of the technical solutions of various embodiments of the present disclosure, should be included in the protection scope of the present disclosure.

What is claimed is:

1. A method comprising:
   receiving, when a quantity of far-field and uncorrelated spatial narrow-band source signals are incident from different directions to a uniform linear array receiver, the narrow-band source signals by a quantity of antenna array elements;
   expressing signals received at different times in matrix form, wherein output signals of the quantity of antenna array elements are expressed in vector form;
   performing one-bit quantization on the received signals;
   re-modeling the received signals after quantization to obtain a joint probability mass model of one-bit quantization Direction of Arrival (DoA) estimation;
   deriving estimated parameters based on the joint probability mass model of the one-bit quantization DoA estimation;
   constructing, based on a maximum likelihood principle and a spatial row sparse property, an optimization model based on the maximum likelihood principle by using the estimated parameters;
   obtaining, based on the optimization model, a steepest descent direction of the optimization model; and
   solving, based on the steepest descent direction of the optimization model, the optimization model by a steepest descent method to obtain both an estimated DoA and a source number; and
   reporting both the estimated DoA and the source number to a radar system.

2. The method according to claim 1, wherein the uniform linear array receiver comprises the quantity of antenna array elements, and a distance between antenna array elements is less than or equal to a half wavelength of the incident signal.

3. The method according to claim 2, wherein,
   when K spatial narrow-band source signals are incident from different directions to the uniform linear array receiver with incident angles of $\theta=[\theta_1, \theta_2, \ldots, \theta_K]^T$, output signals $x_m(n)$ of the m-th array element of the uniform linear array receiver at the n-th snapshot are expressed as:

$$x_m(n) = \sum_{k=1}^{K} s_k(n) e^{j2\pi \frac{(m-1)d\sin\theta_k}{v}} + \epsilon_m(n), m = 1, 2, \ldots, M,$$

where $s_k(n)$ is the k-th source signal incident to the array receiver, $\epsilon_m(n)$ is additive noise of the m-th array element, $j=\sqrt{-1}$ is imaginary unit, e is the base of natural logarithm, v is a wavelength of the source signal, d is a distance between adjacent array elements of the uniform linear array receiver, M is the number of the uniform linear array receivers, and T represents transposition;

arranging the output signals of M array elements at the n-th snapshot to a column vector as:

$$x(n) = As(n) + \epsilon(n),$$

where $x(n)$ is an output signal vector for the M×1 dimension of the array, and is expressed as $x(n)=[x_1(n), x_2(n), \ldots, x_M(n)]^T$; $\epsilon(n)$ is an additive noise vector for the M×1 dimension of the array, and is expressed as $\epsilon(n)=[\epsilon_1(n), \epsilon_2(n), \ldots, \epsilon_M(n)]^T$; $s(n)$ is a spatial source signal for the K×1 dimension, and is expressed as $s(n)=[s_1(n), s_2(n), \ldots, s_K(n)]^T$; and A is a manifold matrix for the M×K dimension, and is expressed as $A=[a(\theta_1), a(\theta_2), \ldots, a(\theta_K)]$, and a steering vector of the k-th source signal is a M×1 dimensional vector, wherein:

$$a(\theta_k) = \left[1, e^{j2\pi\frac{d\sin\theta_k}{v}}, \ldots, e^{j2\pi\frac{(M-1)d\sin\theta_k}{v}}\right]^T,$$

where additive noise vector, $\epsilon(n) \sim CN(0, \sigma^2 I_M)$, represents $E(n)$ follows a complex circular Gaussian distribution with a mean value of all-zero vector 0 in M×1 dimension and a covariation matrix of $\sigma^2 I_M$, wherein $\sigma^2$ is a variance of noise, $I_M$ represents an identity matrix of the M×M dimension and is independent of the source signals;

when performing quantization to the array output signals $x(n)$ by using one-bit ADCs, the array output signals are one-bit signals and expressed as $y(n)$, $y(n)$ satisfies a target model of the one-bit quantization DoA estimation:

$$y(n) = \text{sgn}(\Re[x(n)]) + j\text{sgn}(\Im[x(n)]),$$

where $\Re[\cdot]$ and $\Im[\cdot]$ represent real and imaginary parts of a complex number, respectively, and sgn(·) is a sign function; and one-bit output signals at the n-th snapshot is obtained by using independent identically distributed observation, where $Y=[y(1), y(2), \ldots, y(N)] \in \mathbb{C}^{M \times N}$, $\mathbb{C}$ represents complex domain, the joint probability mass model is:

$$p(Y;\alpha) = \prod_{n=1}^{N}\prod_{m=1}^{M} \Phi\left(\Re[y_{mn}]\frac{\sqrt{2}\Re[A_m s(n)]}{\sigma}\right)\Phi\left(\Im[y_{mn}]\frac{\sqrt{2}\Im[A_m s(n)]}{\sigma}\right),$$

where $\alpha$ includes the parameters to be estimated, and $\alpha=[\theta, \sigma, s(1), \ldots, s(N)]^T$, $\sigma$ is a standard deviation of the noise, $A_m$ is the m-th row of a matrix A, $y_{mn}$ is a (m, n) element of a matrix Y, and $\phi(\cdot)$ is a cumulative distribution function of standard normal distribution.

4. The method according to claim 3, wherein the step of deriving the parameters to be estimated based on the joint probability mass model of one-bit quantization DoA estimation, further comprises:

taking a logarithm of both sides of the equation of the joint probability mass model at the same time to obtain a one-bit negative log likelihood function:

$$l(Y;\alpha) = \sum_{n=1}^{N}\sum_{m=1}^{M} -\ln\left(\Phi\left(\Re[y_{mn}]\frac{\sqrt{2}\Re[A_m s(n)]}{\sigma}\right)\right) - \ln\left(\Phi\left(\Re[y_{mn}]\frac{\sqrt{2}\Im[A_m s(n)]}{\sigma}\right)\right),$$

according to the maximum likelihood principle, minimizing the one-bit negative log likelihood function to obtain an estimated value $\hat{\alpha}$ of $\alpha$:

$$\hat{\alpha} = \arg\min_{\alpha} \sum_{n=1}^{N}\sum_{m=1}^{M} f(\Re[y_{mn}]\Re[A_m z(n)]) + f(\Im[y_{mn}]\Im[A_m z(n)]),$$

where $z(n) \triangleq \sqrt{2}s(n)/\sigma$, $f(x) \triangleq -\ln(+(x))$, and $\triangleq$ represents "to be defined as".

5. The method according to claim 4, wherein the step of constructing, based on the maximum likelihood principle and the spatial row sparse property, the optimization model based on the maximum likelihood principle by using the parameters to be estimated, further comprises:

dividing the signal space evenly into L search grids $\varphi=[\varphi_1, \varphi_2, \ldots, \varphi_L]^T$, where K is less than L, and K and L are both positive integers; obtaining a manifold dictionary B, and $B=[a(\varphi_1), a(\varphi_2), \ldots, a(\varphi_L)] \in \mathbb{C}^{M \times L}$; constructing a sparse vector $u(n)$ with K sparsity in L×1, and the vector $u(n)$ is an extension of $z(n)$, each element of the vector $u(n)$ is:

$$u_l(n) = \begin{cases} z_k(n), & \text{if } \phi_l = \theta_k \\ 0, & \text{otherwise} \end{cases} l = 1, 2, \ldots, L; k = 1, 2, \ldots, K,$$

where $u_l(n)$ represents the l-th element of $u(n)$, and $z_k(n)$ represents the k-th element of $z(n)$;

when there are N snapshots, a row sparse matrix U with K sparsity is obtained, and $U=[u(1), u(2), \ldots, u(N)] \in \mathbb{C}^{L \times N}$; based on the row sparse matrix U with K sparsity, the estimated value $\hat{\alpha}$ of $\alpha$ is converted into an optimization model $\hat{U}$ based on the maximum likelihood principle:

$$\hat{U} = \arg\min_{U} L(U) + \lambda \|U\|_{2,1},$$

where $\lambda$ represents controlled regular parameter used for balancing a fitting of likelihood term and a row sparsity of the matrix, and $\lambda > 0$, $\|U\|_{2,1}$ represents $l_{2,1}$ norm of the matrix U, and L(U) represents a likelihood function:

$$L(U) = \sum_{n=1}^{N}\sum_{m=1}^{M} f(\Re[y_{mn}]\Re[B_m u(n)]) + f(\Im[y_{mn}]\Im[B_m u(n)]).$$

6. The method according to claim 5, wherein the step of obtaining, based on the optimization model, the steepest descent direction of the optimization model, further comprises:
- calculating a conjugate gradient of L(U) and $\|U\|_{2,1}$ with respect to U by using Wirtinger's calculus, to obtain conjugate gradient matrices $\partial L(U)/\partial U^*$ and $\partial \|U\|_{2,1}/\partial U^*$; and
- transforming and simplifying the conjugate gradient matrices $\partial L(U)/\partial U^*$ and $\partial \|U\|_{2,1}/\partial U^*$, to obtain the steepest descent direction $\Delta U$.

7. The method according to claim 6, wherein the step of solving, based on the steepest descent direction of the optimization model, the optimization model by the steepest descent method to obtain the estimated DoA and the source number, further comprises:
- based on the steepest descent direction $\Delta U$, solving the optimization model by steepest descent method to obtain $\hat{U}$; and
- calculating a normalized spatial power spectrum of $\hat{U}$, and obtaining the estimated DoA and the source number based on positions and numbers of peaks of the normalized spatial power spectrum.

8. An intelligent terminal, comprising:
- a non-transitory memory;
- a processor; and
- a one-bit quantization DoA estimation program stored in the non-transitory memory, and, when the program is executed by the processor, the steps of the method according to claim 1 are implemented.

* * * * *